United States Patent
Fritz et al.

(10) Patent No.: US 11,809,572 B2
(45) Date of Patent: Nov. 7, 2023

(54) TRUST VALIDATION FOR SOFTWARE ARTIFACTS

(71) Applicant: International Business Machines Corporation, Armonk, NY (US)

(72) Inventors: Florian Fritz, Filderstadt (DE); Timo Kussmaul, Boeblingen (DE); Dennis Zeisberg, Bielefeld (DE); Angel Nunez Mencias, Stuttgart (DE); Dimitrij Pankratz, Boeblingen (DE); Stefan Liesche, Böblingen (DE); Sebastian Hense, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 17/472,972

(22) Filed: Sep. 13, 2021

(65) Prior Publication Data

US 2023/0079773 A1 Mar. 16, 2023

(51) Int. Cl.
G06F 21/00 (2013.01)
G06F 21/57 (2013.01)
G06F 21/64 (2013.01)

(52) U.S. Cl.
CPC ............ G06F 21/577 (2013.01); G06F 21/64 (2013.01); *G06F 2221/033* (2013.01)

(58) Field of Classification Search
CPC ... G06F 21/577; G06F 21/64; G06F 2221/033
See application file for complete search history.

(56) References Cited

U.S. PATENT DOCUMENTS

| 9,230,122 | B2 | 1/2016 | Ghose | |
|---|---|---|---|---|
| 2006/0107318 | A1* | 5/2006 | Jeffries | H04L 63/1416 726/22 |
| 2019/0207957 | A1 | 7/2019 | Espinosa et al. | |
| 2021/0029151 | A1* | 1/2021 | Brooks | H04L 9/3218 |
| 2022/0207186 | A1* | 6/2022 | Young | G06F 21/64 |

FOREIGN PATENT DOCUMENTS

DE 102014222300 A1 5/2016

* cited by examiner

*Primary Examiner* — Ghazal B Shehni
(74) *Attorney, Agent, or Firm* — Scott S. Dobson

(57) ABSTRACT

A computer-implemented method for building trusted executable software using trusted building units, wherein a path between the building units is untrusted, is disclosed. The method comprises generating, by each of the trusted building units, an identifier for identifying an output of the respective trusted building unit, wherein the respective trusted building unit also generates a signed confirmative certificate comprising the identifier. The method comprise as well utilizing, by each of the distributed trusted building units, output results of at least one of a predecessor build unit of the trusted building unit as input, validating that each of the signed confirmative certificates conforms to a predefined set of policy rules, and upon a failed validating of the signed confirmative certificate of one of the trusted building units, terminating the building of the trusted executable software.

20 Claims, 9 Drawing Sheets

TRUST VALIDATION FOR SOFTWARE ARTIFACTS

BACKGROUND

Field of the Invention

The present disclosure relates generally to building trusted executable software, and more specifically, to a computer-implemented method for building trusted executable software using trusted building units, wherein a path between the building units is untrusted. The present disclosure relates further to a software build system for building trusted executable software using trusted building units, and a computer program product.

Related Art

Building new software at an ever increasing speed for a more and more complex IT (information technology) environment—very often based on cloud computing environments—remains a constant challenge for enterprise IT organizations. Modern software development and deployment frameworks typically include multiple build and deployment steps during which different supporting units may be used. Each step may depend on an input from one or more prior steps in the build process. Automated audits are widely used today to enforce certain quality and safety requirements at every step, e.g., tests executed, minimal accepted test coverage, number and severity of static security scan findings, and so on.

However, these automatic tests require blind trust that the results of the previous steps, especially the previous tests, are still valid and/or not tempered. Moreover, once all steps are passed, these security measures cannot influence the execution of the deployed software artifacts (e.g., executable software applications or parts thereof), even if the deployed software artifacts are outdated and would not pass again one of the checks.

Thus, it may become almost impossible to test or confirm that the deployed software artifacts are still in compliance with the previous checks and tests. However, this may be crucial for security relevant or highly regulated organizations. A naive approach may require to periodically re-run build- and deployment steps. However, this would be an extremely inefficient process and may only provide a slight improvement in software quality, reliability and security compliance.

Hence, it would be desirable to redesign the software build process and potentially also the deployment process in order to ensure that only trusted executable software components are built and deployed.

There are several disclosures related to a computer-implemented method for building trusted executable software using trusted building units, wherein a path between the building units is untrusted. Document DE 10 2014 222 300 A1 discloses a method for verifying a trust status of a certificate or key. The method includes a step of determining a hash value for the certificate or key, a step of determining a host label from the certificate or key, and a step of retrieving a DNS resource record using the host label.

As another example, document US 2019/0 207 957 A1 discloses a system and method for enabling and verifying the trustworthiness of a hardware system. To determine whether an IoT system connected with a network environment is compromised, a networked Trust-as-a-Service (TaaS) server receives system data indicative of various characteristics of the IoT system, wherein the system data is harvested by a software agent installed on the IoT system. The TaaS server initially establishes a baseline characteristics profile for the IoT system, such that subsequently received system data from the software agent may be compared against the baseline characteristics profile to quickly identify discrepancies between the originally established baseline characteristics profile and current operating characteristics of the system.

However, such examples do not, or only in a limited form, address the requirement of generating, i.e., building trusted executable software from the start on. Hence, there may be a need to overcome these limitations, in particular, to provide a system for building trusted software which also works in cloud computing environments in a safe way.

SUMMARY OF THE INVENTION

According to one aspect of the present disclosure, a computer-implemented method for building trusted executable software using trusted building units, wherein a path between the building units is untrusted may be provided. The method may comprise generating, by each of the trusted building units, an identifier for identifying an output of the respective trusted building unit, wherein the respective trusted building unit also generates a signed confirmative certificate comprising the identifier. The method may also comprise utilizing, by each of the distributed trusted building units, output results of at least one of a predecessor build unit of the trusted building unit as input, validating that each of the signed confirmative certificates conforms to a predefined set of policy rules, and upon a failed validating of the signed confirmative certificate of one of the trusted building units, terminating the building of the trusted executable software.

According to another aspect of the present disclosure, a software build system for building trusted executable software using trusted building units may be provided. The system may comprise a processor and a memory, communicatively coupled to said processor, wherein said memory stores program code portions that, when executed, enable the processor, to generate, by each of the trusted building units, an identifier for identifying an output of the respective trusted building unit, wherein the respective trusted building unit also generates a signed confirmative certificate comprising the identifier. The processor may also be adapted to utilize, by each of the distributed trusted building units, output results of at least one of a predecessor build unit of the trusted building unit as input, validate that each of the signed confirmative certificates conforms to a predefined set of policy rules, and, upon a failed validating of the signed confirmative certificate of one of the trusted building units, terminate the building of the trusted executable software.

The proposed computer-implemented method for building trusted executable software using trusted building units, wherein a path between the building units is untrusted may offer multiple advantages, technical effects, contributions and/or improvements:

The proposed method and the related system may ensure that all steps of a build and deployment pipeline and their respective build results are valid and have not been revoked or tempered. This may have special benefits for organizations developing software which may use source code components from open-source repositories and/or other sources in order to deploy a completely new trusted executable software application comprising software artifacts from different sources, deployable under different license terms and available in different phases of the lifetime.

The proposed method may also allow controlling the process and the steps of building of the software as well as an execution of the software by re-validating security scans or other constraints like legal requirements or other policy conditions. It may make it also easier for the software development organization to stay in compliance with enterprise compliance rules and systems, as well as, licensing constraints.

For a developer, as well as for the deployment organization, the proposed method, as well as the related system, may be completely transparent because it is designed to run in the background and to support the developer or the deployment controlling staff.

By relying on available key management systems, no other individual security prerequisites have to be fulfilled. The proposed method is self-contained and may be configured for regular re-validation and security re-scans in order to stay compliant with policy rules in a completely automated way, also during the deployment phase of the software application.

Furthermore, the here proposed concept may also avoid to rebuild the complete trusted executable software executing the build process in order to determine that the trusted executable software is still in compliance with all rules and regulations. The trusted executable software may be fetched from a repository and the checks may be performed for the executing software due to the availability of all signed conformance certificates for the trusted executable software (form the previous build process). Then, it may be executed.

In the following, additional embodiments of the inventive concept—applicable for the method as well as for the system—will be described.

According to one useful embodiment of the method, the signed confirmative certificate may be based on an Internet security certificate (e.g., X.509) comprising additional validation information. This additional validation information may be stored in its extended version of the Internet security certificate in dedicated additional fields of the protocol.

According to another useful embodiment of the method, the validating of the signed confirmative certificate may include a standard method of revoking Internet security certificates, and/or wherein all trusted build/building units or trusted executing environment units for an execution of the build trusted software use standard methods for an Internet certificate revocation checking. Hence, the proposed mechanism is not only useful for the build process of the trusted executable software but may also be used successfully during the deployment phase in a secure execution environment.

According to a preferred embodiment of the method, the identifier may be a hash value of the output—or one of the outputs—of the respective build unit. Depending on the selected hashing mechanism/algorithm a unique value for each output of each building unit may be generated. Furthermore, determining a hash value is computation-wise comparably "cheap". I.e., only little computational resources may be required for this.

According to one advantageous embodiment of the method, the generating the signed confirmative certificate may also comprise testing the build trusted executable software. Such testing/tests may comprise function tests, security feature tests, license checks and other compliance rule compatibility, and so on. In case the test may fail, the signed confirmative certificate will not be generated. Hence, not any certificates may confirm that all test requirements have been met. However, it may be possible that a signed confirmative certificate may have been generated comprising statements that indicate which requirements are met and which are not. This way, a tracking of insufficiencies in the development and the process may become possible in an easy and reliable way.

According to one optional embodiment, the method may also comprise re-validating the build trusted executable software and generating a related new signed confirmative certificate. This may be done for software that is executed, but it may also be done for any software artifact currently not used and which may only be stored in an artifact repository. Hence, it may be ensured that all available software artifacts—either under execution/deployment or only ready for execution—may be controlled using a reliable process in order to ensure that they are all compliant with regulatory and legal requirements as well as company internal policies.

According to a further developed embodiment of the method, the re-validating may be repeated for a plurality of different security scan types. Thereby, it may be configurable which of the differently available security scan types may be selected for a specific re-validation. Hence, in order to keep the computational price for such re-validations comparably low, a different security scan type and a round-robin approach may therefore be selected each time a re-validation is planned. Additionally, for key dates like an end-of-the-year re-validation, special attention may be given to legal or license requirements, or the like.

According to one interesting embodiment of the method, the generating the signed confirmative certificate may represent that the output of the trusted build unit may comply with a predefined set of rules and/or which rules requirements may not be met. This may be configured in a build unit specific way. I.e., different build units may have to comply with a different set of predefined rules.

According to one advanced embodiment of the method, the predefined set of rules may be stored outside a development framework of which the trusted build units are part of. Hence, enterprise-wide or cross-enterprise policy frameworks or policy repositories may be used in order to control the build process of trusted executable software applications.

According to another advantageous embodiment, the method may also comprise terminating an execution of the trusted executable software if a validation or re-validation of any of the signed confirmative certificates may fail during an execution phase of the output of the trusted build units. Hence the proposed method and system may not only be advantageous for the build process of the trusted executable software but also for the deployment phase of the software and an extension to the deployment system.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the present disclosure are described with reference to different subjectmatters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject—matters, in particular, between features of the method type claims, and features of the apparatus type claims, is considered as to be disclosed within this document.

The aspects defined above and further aspects of the present disclosure are apparent from the examples of embodiments to be described hereinafter and are explained with reference to the examples of embodiments, to which the disclosure is not limited.

Figure 1:
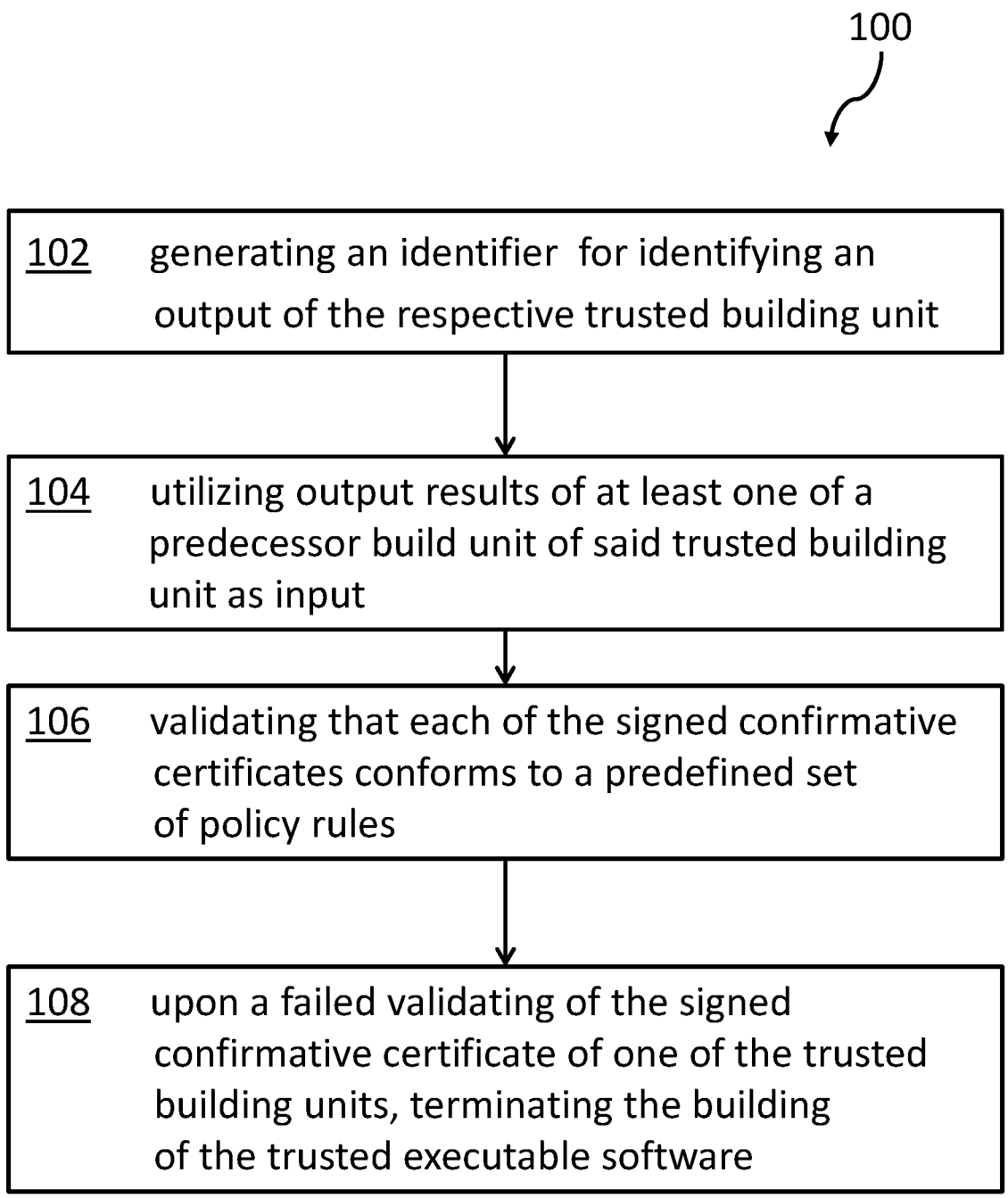

Preferred embodiments of the disclosure will be described, by way of example only, and with reference to the following drawings:

FIG. 1 shows a block diagram of an embodiment of the inventive computer-implemented method for building trusted executable software using trusted building units, wherein a path between the building units is untrusted.

Figure 2:
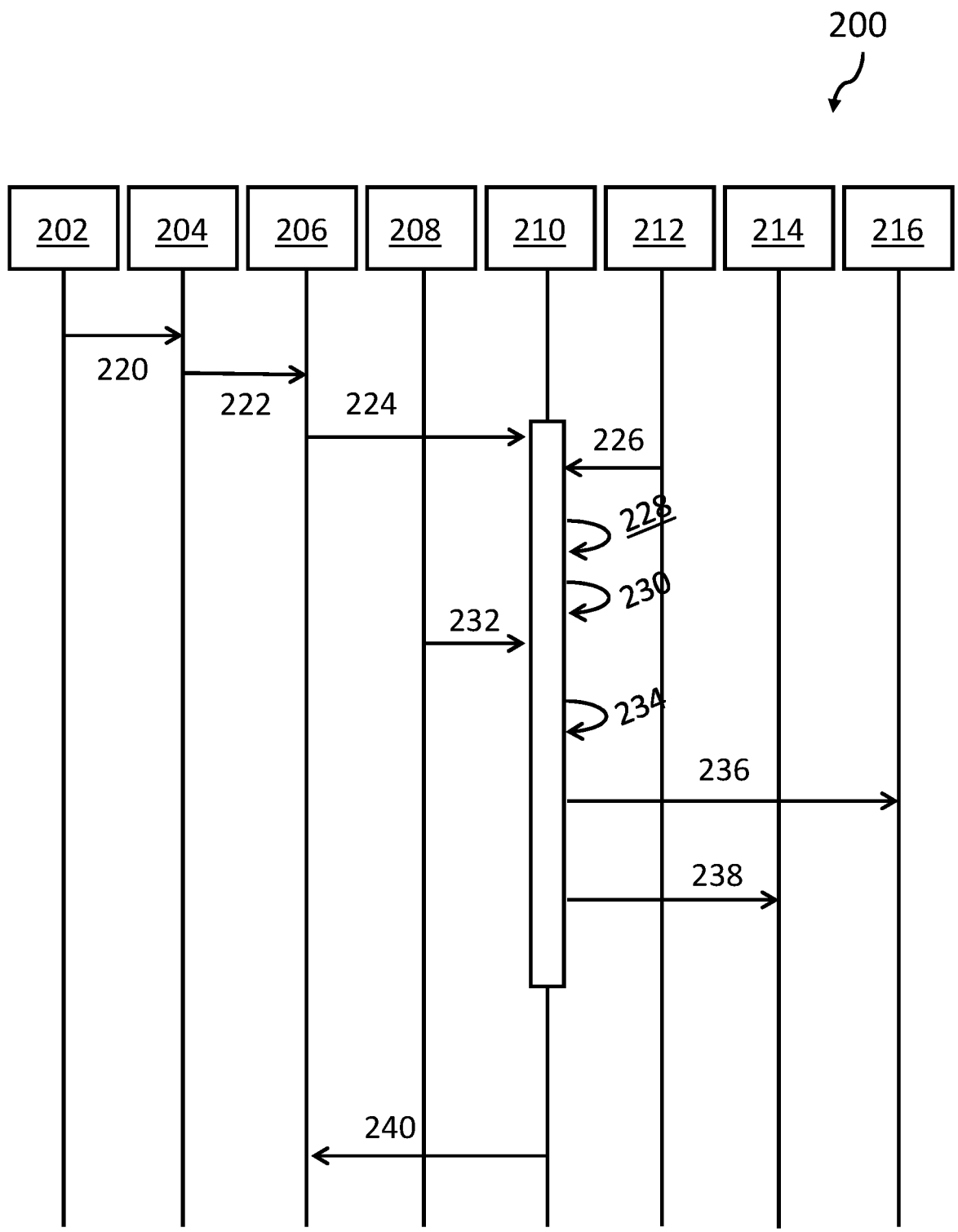

FIG. 2 shows a timing or sequence diagram of at least a part of the proposed build method.

Figure 3:
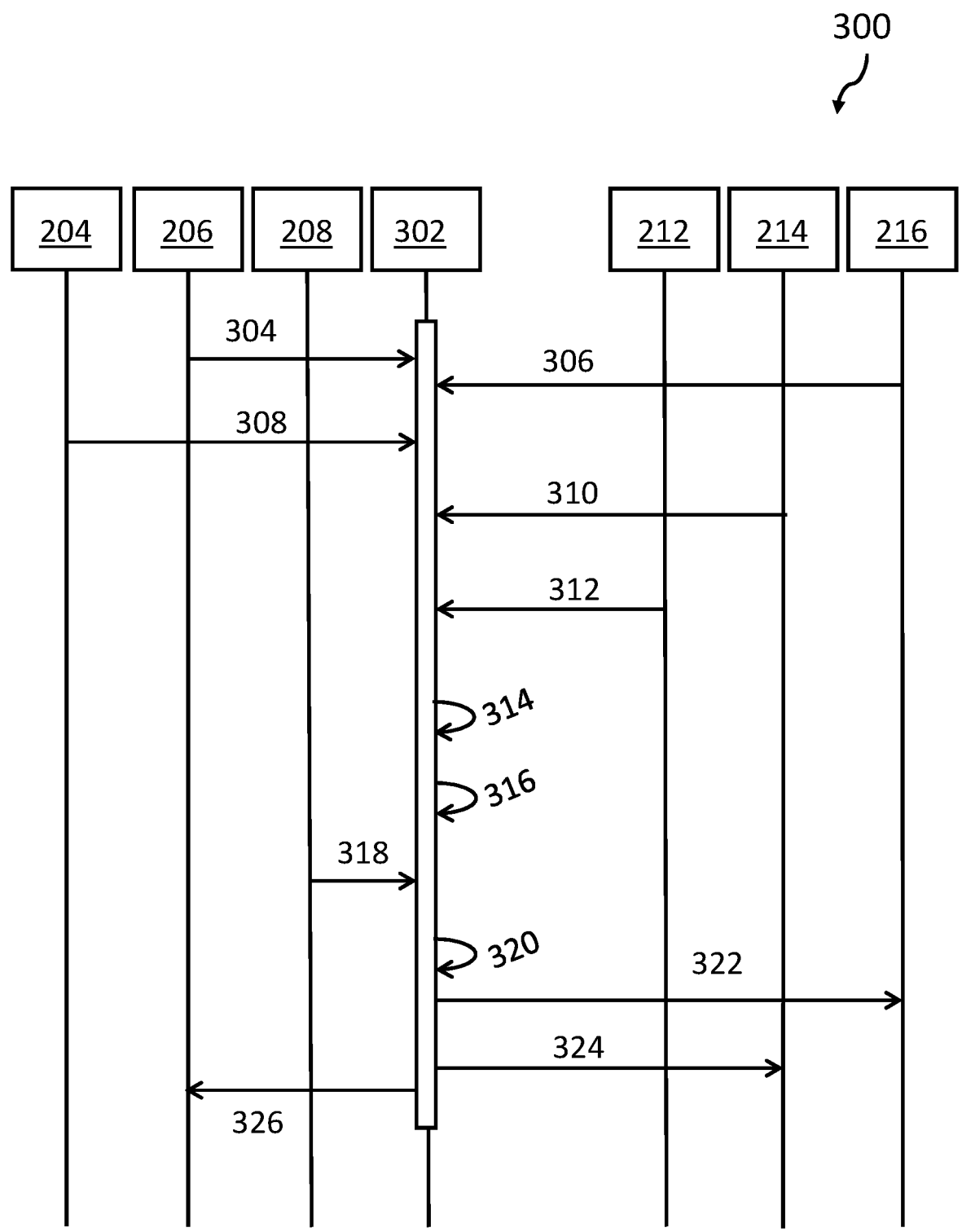

FIG. 3 shows a timing or sequence diagram of at least a part of a test cycle for the software artifact being built as a result of the timing diagram of FIG. 2.

Figure 4:
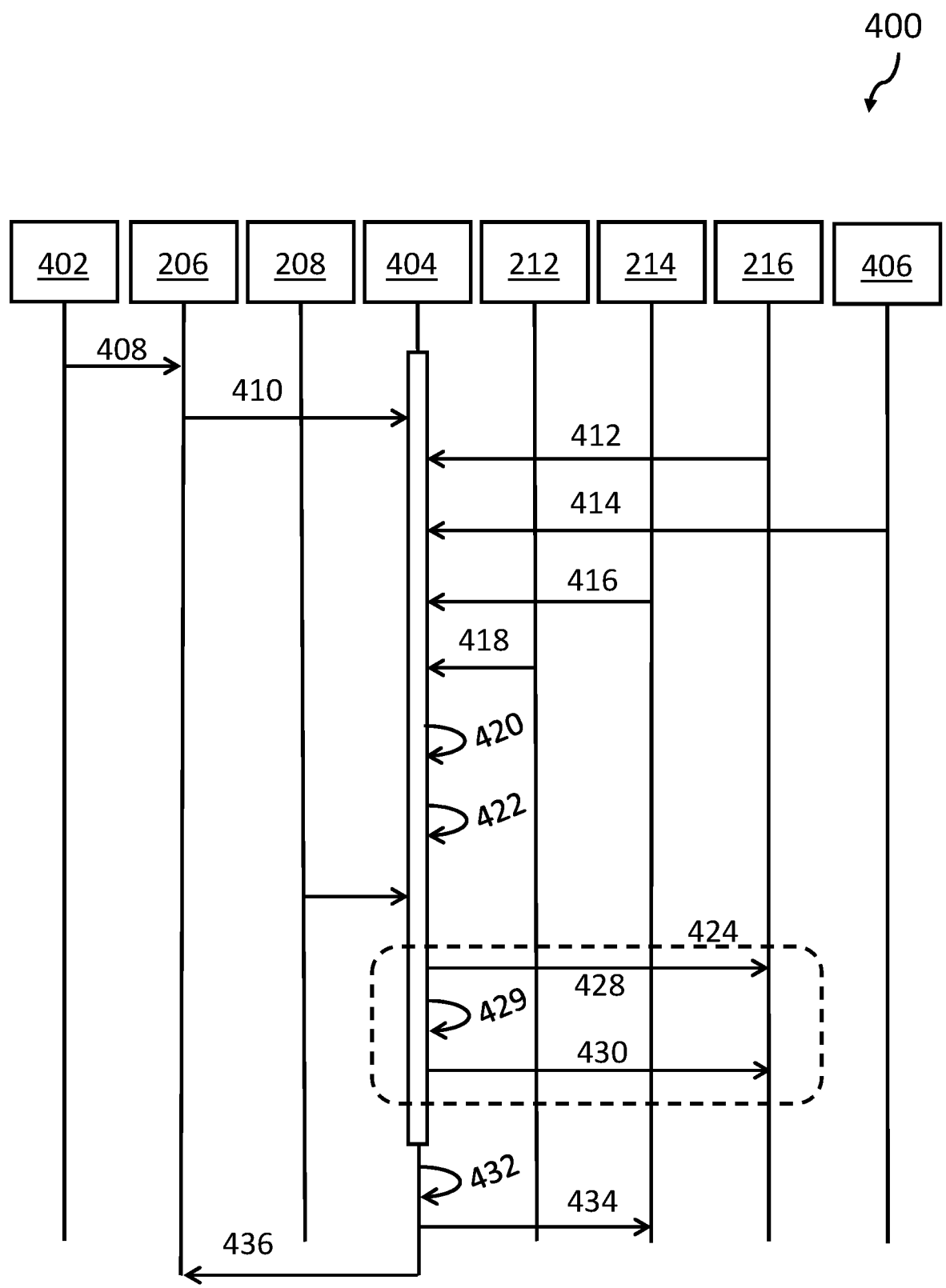

FIG. 4 shows a timing or sequence diagram of an exemplary re-validation procedure.

Figure 5:
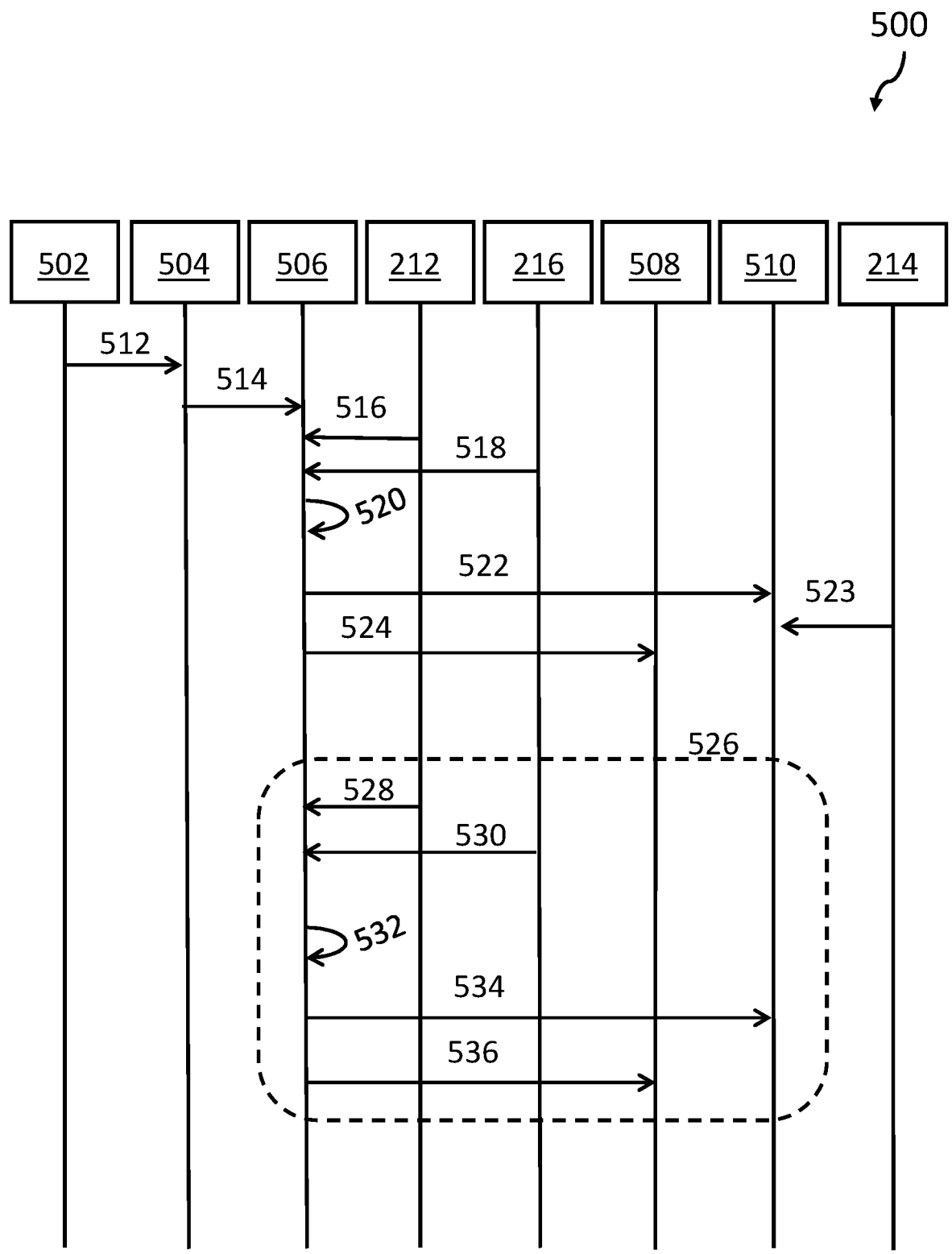

FIG. 5 shows a timing or sequence diagram of an exemplary software development process using the inventive method for building trusted executable software.

Figure 6:
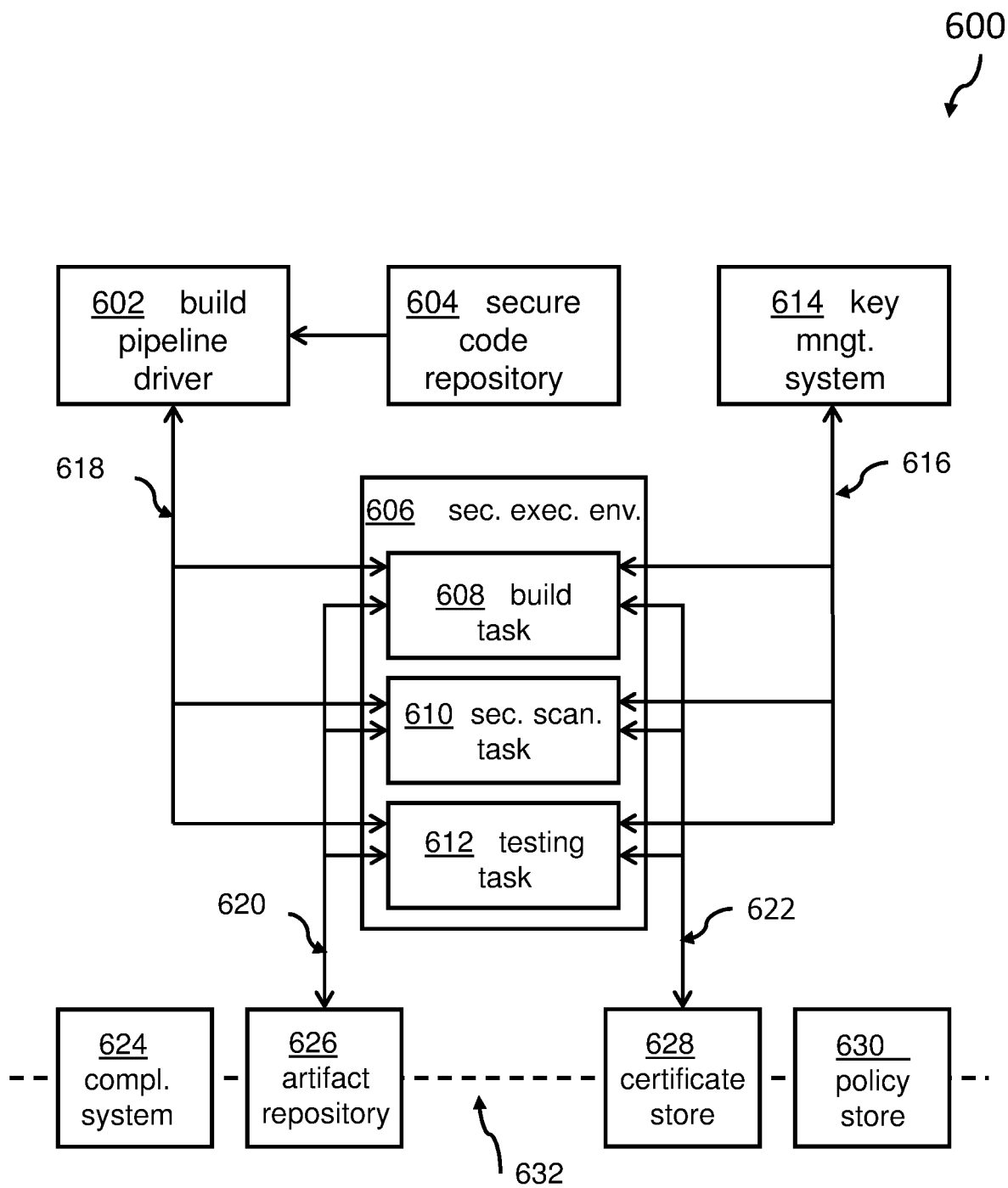

FIG. 6 shows a first portion of a block diagram of exemplary components of a system supporting the method for building trusted executable software using trusted building units.

Figure 7:
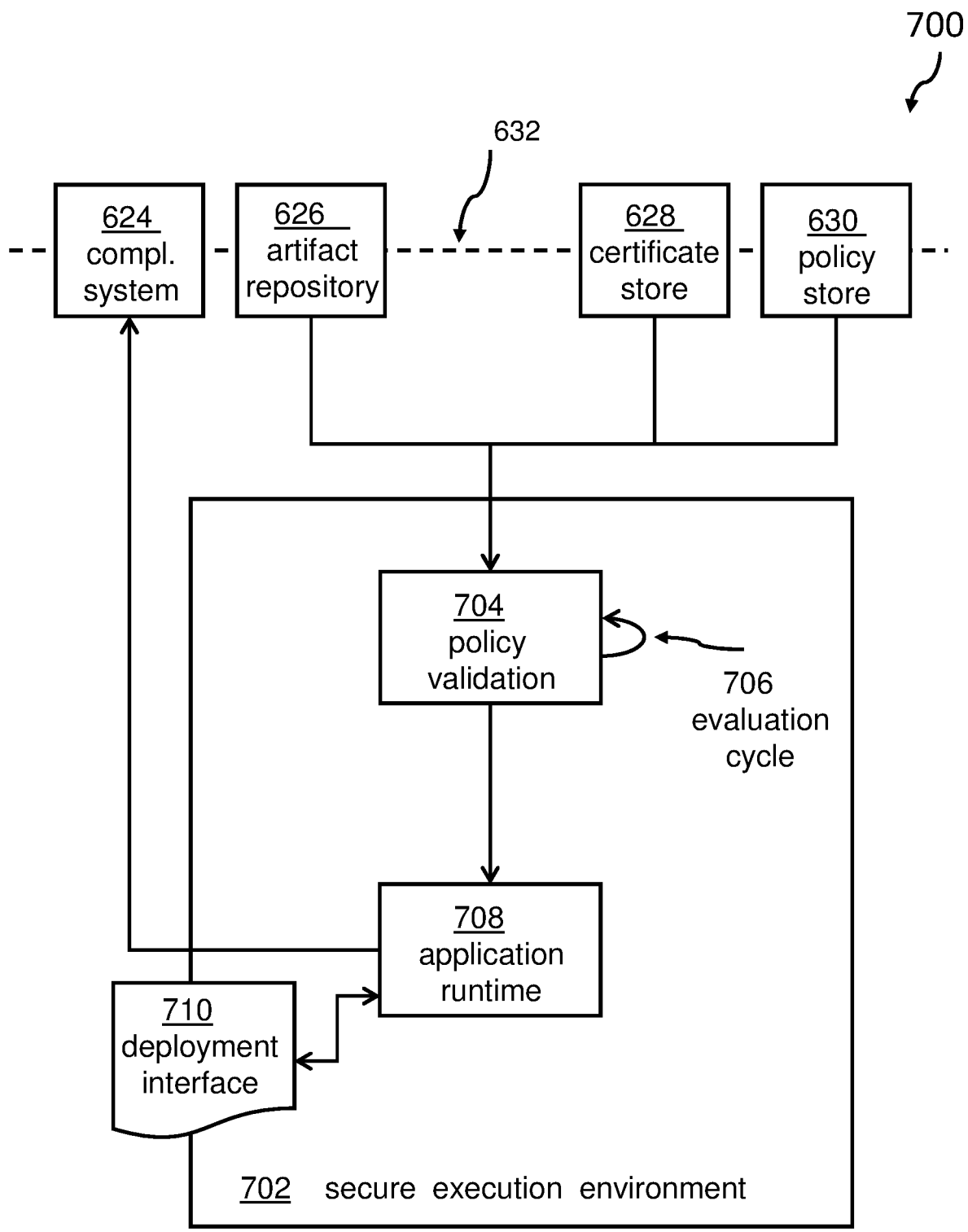

FIG. 7 shows a second portion of the block diagram of FIG. 6 of exemplary components of a system supporting the method for building trusted executable software.

Figure 8:
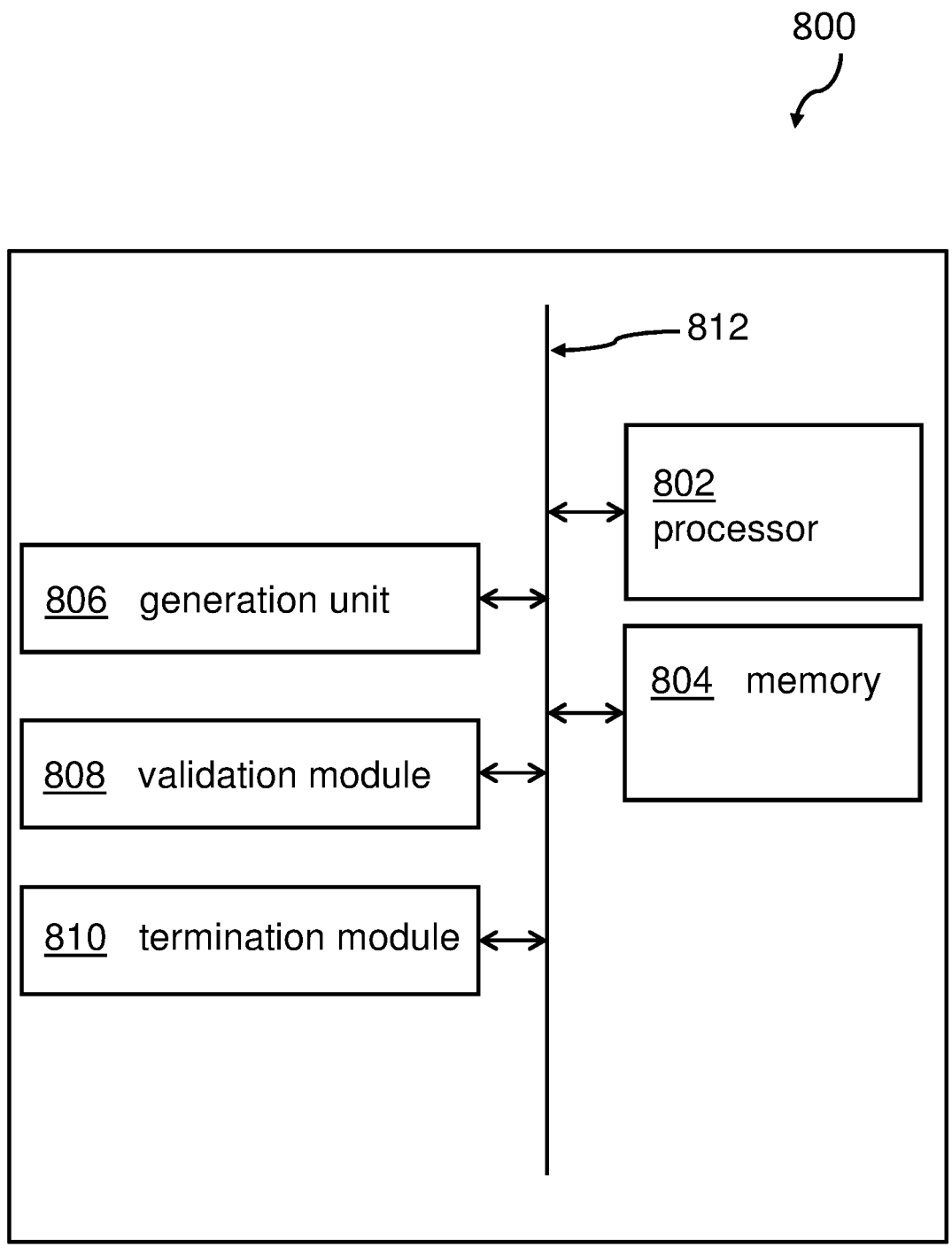

FIG. 8 shows a block diagram of an embodiment of the inventive software build system for building trusted executable software using trusted building units.

Figure 9:
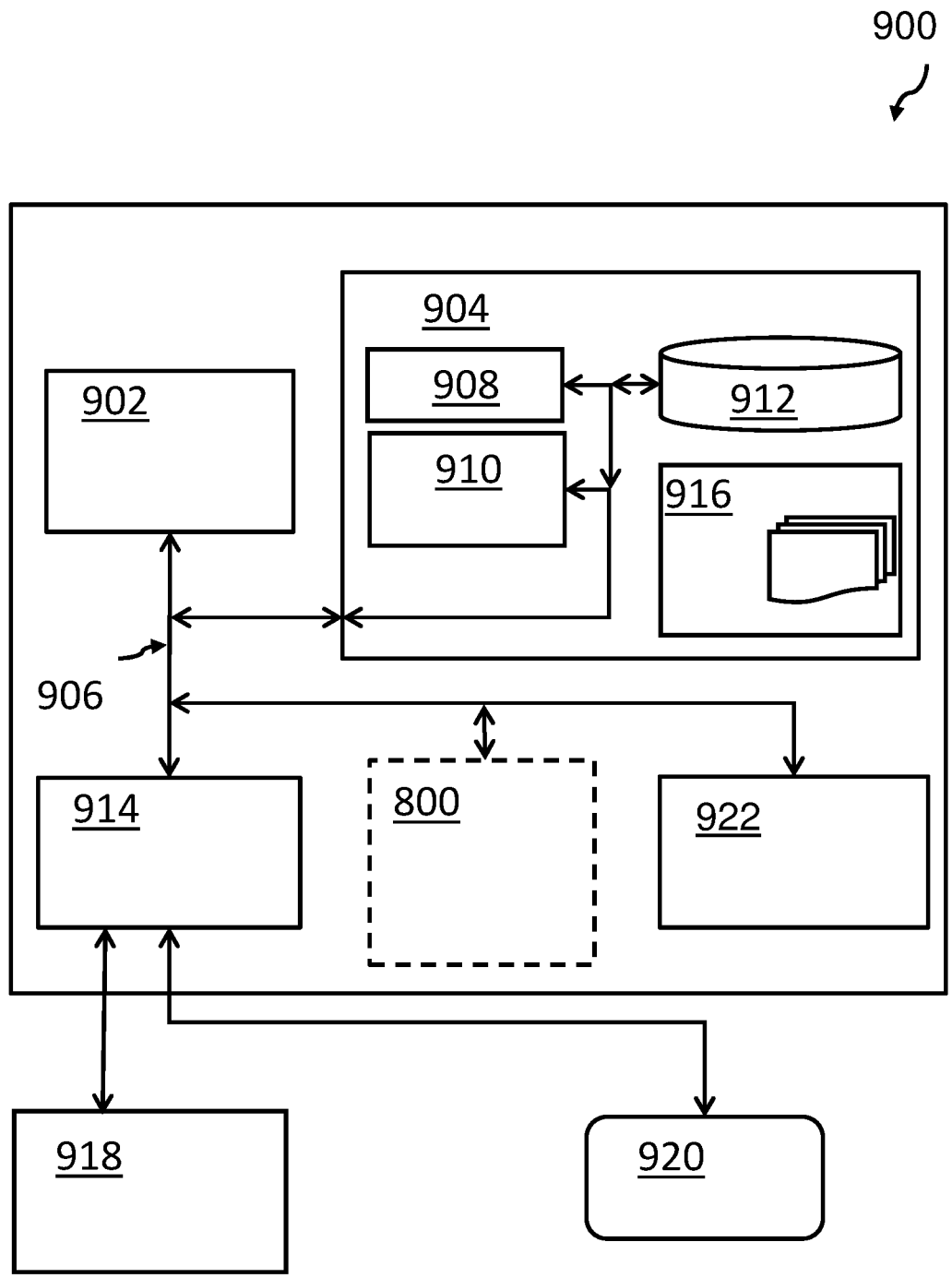

FIG. 9 shows an embodiment of a computing system comprising the system according to FIG. 8.

DETAILED DESCRIPTION

In the context of this description, the following conventions, terms and/or expressions may be used:

The term 'trusted executable software' may denote a software artifact or a complete software application—or even a software library or a component thereof (e.g., a Docker image)—for which it may be ensured that the build process for the trusted executable software may have not been compromised by cyber-security attacks. Hence, the trusted executable software (artifact) shall be temper-free and be compliant with a predefined set of policy rules.

The term 'trusted building unit' may denote one of the elements or activities/tasks required for building the trusted executable software or its related artifacts. The building may control and manage one (or more) of the steps of building executable software starting after the source code has been developed. It may also comprise pulling in additional source code from other repositories and defining dependencies and interfaces to data sources or other system The term 'path between the building units' may denote a physical or logical way, software artifacts "travel" in a step-by-step approach in order to build the trusted executable software. More than one build units may be required in order to build the trusted executable software starting from some source code. One built unit may use the output of a predecessor build unit as its input. Also this may be denoted as a path between building units.

The term 'identifier' may denote a digital value—e.g., a hash value—being unique for an object to be identified. The object to be identified may here be an output of a build unit.

The term 'output' may denote anything that may be generated by a build unit. It may be the final build product, an intermediate product in the build pipeline or additional metadata from the building process.

The term 'signed confirmative certificate' may denote a sort of document comprising the identifier as well as statements about the output of a build unit. One potential statement may be that the output of the build unit may be compliant with currently valid policy rules. Another potential statement may describe whether or to which extent the output of the build unit may be security rule compliant. A variety of different statements about the output of the build units are possible here.

The term 'predecessor build unit' may denote a build unit using the output of a build unit—or more than one—positioned earlier in the build pipeline.

The term 'predefined set of policy rules' may denote any compliance or requirement or security requirements a software artifact has to comply with in order to be denoted as trusted executable software or trusted deployable software. Hence, the predefined set of policy rule may control the build process of the software artifact as well as its deployment.

The term 'Internet security certificate' may denote the known security network protocol (IPsec) suite which may authenticate and encrypt packets of data to provide secure encrypted communication between two, e.g., computers or two components within a computer over a public network, e.g., the Internet protocol network. It should be noted that in large cloud computing systems, the Internet protocol may also be used for internal communication purposes. Hence, IPsec may also be used in virtual private networks.

The term 'secure execution environment' or also 'trusted execution environment' may denote here that a computing may be performed in an environment that guarantees code and data protection with respect to confidentiality and integrity. It may also comprise security features such as isolated execution, integrity of applications executing with the secure execution environment, along with confidentiality of related assets. A hardware security module may support the secure execution environment.

In the following, a detailed description of the figures will be given. All instructions in the figures are schematic. Firstly, a block diagram of an embodiment of the inventive computer-implemented method for building trusted executable software using trusted building units, wherein a path between the building units is untrusted, is given. Afterwards, further embodiments, as well as embodiments of the software build system for building trusted executable software using trusted building units will be described.

FIG. 1 shows a block diagram of a preferred embodiment of the computer-implemented method 100 for building trusted executable software using trusted building units, wherein a path between the building units is untrusted. The method comprises generating, 102, by each of the trusted building units, an identifier—e.g., a hash value of an output of the respective build unit—for identifying an output of the respective trusted building unit, wherein the respective trusted building unit also generates a signed confirmative certificate comprising the identifier. It should also be noted that one single build unit can have more outputs. It should also be noted that the signed confirmative certificate may comprise the identifier as well as statements about the output provided by the specific load unit. It may comprise statements about a compliance with certain policy rules, and so on. For the signing of the conformance certificate, standard security protocols and standard key mechanisms like PKI (public key infrastructure) may be used beside other security protocols.

The method 100 comprises further utilizing, 104, by each of the distributed trusted building units, output results of at least one of a direct predecessor build unit or other more upstream predecessor build units of a current trusted building unit as input, and validating, 106, that each of the signed confirmative certificates conforms to a predefined set of policy rules.

Last but not least, the method 100 comprises terminating, 108, the building of the trusted executable software if a validation of the signed confirmative certificate fails—e.g., either due to a key not trusted or due to a revocation process or due to an expired certificate—of one of the trusted building units. Hence, it may be ensured that temper proven software leaves the build process. It may be prevented that the build process for the specific software artifact may not be compromised by any security attacks. Hence, the trusted executable software may be loaded into a secured execution and/or deployment system without a risk of loading already compromised software applications into the secure execution environment.

FIG. 2 shows a timing or sequence diagram of at least a part of the proposed build method 200. The blocks on top of FIG. 2 represent certain stages of the software build process, like the developer 202, a source code repository 204, a build pipeline driver 206, a key management system 208, the build task 210 itself, a policy store 212, a software artifact repository 214 and a certificate store 216.

The process flow can be described as follows: the developer 202 checks in, 220, his developed source code into the source code repository 202. From or by the source code repository 204, a build job can be triggered, 222, to activate the build pipeline driver 206. This starts, 224, the build task 210.

Firstly, build policies can be received 226 from the policy store 212. Then, the input is validated, 228, and the software artifact is created, 230. Next, the build task 210 receives, 232, (e.g., due to a request) a signing key. With this, the built software artifact and a signed confirmative certificate—in short "certificate"—is signed, 234, and the certificate is stored, 236, in the certificate store 216. Additionally, the built software artifact is stored, 238, in the artifact repository 214. At the end of the build task 210, a signal "build complete" is sent, 240, to the build pipeline driver 206. With this, the secure software build process can be finished.

FIG. 3 shows a timing or sequence diagram of at least a part of a test cycle 300 for the software artifact being built as a result of the timing diagram of FIG. 2. Most of the stages used in FIG. 2 do have the same reference numerals also here. It should be noted that the testing task 302 has been added.

Initially, the build pipeline driver 206 starts, 304, the test task 302. This then receives, 306 the required certificates from the certificate repository 216. Next, the testing task 302 receives the command 308 to get the required source, i.e., receives it from the source code repository 204.

Then, the testing task 302 receives, 310, other software artifacts from the artifact repository 214 as well as the policies (arrow 312). Next, the received input is validated, 314, and tested, 316, according to defined test scenarios.

If the test has been performed successfully, the testing task 302 receives, 318, a signing key so that it is enabled to sign the artifact and the certificate, 320. After this, the certificate is stored, 322, in the certificate store, and the test artifacts are stored, 324, in the artifact repository 214. At the end of the testing process, the testing task 302 signals, 326, to the build pipeline driver that the tests has been completed successfully.

An equivalent sequence diagram could be drawn for a security scan procedure during the deployment process. However, in this case the build pipeline driver 206 triggers the scanning task (not shown) which would execute all the steps of the testing task 302 instead of this. At the end of the security scan procedure, the scanning task then notifies the build pipeline driver that the security scan has been completed successfully.

FIG. 4 shows a timing or sequence diagram of an exemplary recertification procedure or, to be consistent, re-validation procedure 400. The recurring scan trigger unit 402 initiates, 408, schedule-based a re-validation of the built software. The build pipeline driver 206, in turn, starts the security scan task 404. As a reaction, the security scan task 404 receives, 412, the required certificates from the certificate repository 216, receives, 414 the source code from a source code management system 406, receives, 416, the artifacts to be security scanned from the artifact repository 214, and receives, 418 required policies from the policy store 212.

The security scanning task then validates, 420, the received input and executes, 422, the scanning process. The box 424, shown as dashed line, differentiates activities of a failed scan and a successful scan. In case of a failed scan, a revocation message is stored, 428, in the certificate store 216. In case of a successful scan, the certificate is signed, 429, and the certificate is stored, 430, in the certificate store 216.

Next, the successfully scanned artifacts are signed, 432, and the scanned artifacts are stored, 434 in the artifact repository 214. Finally, the security scanning task 404 is completed by sending a "scan complete" message to the build pipeline driver 206.

FIG. 5 shows a timing or sequence diagram of an exemplary software development process 500 using the inventive method for building trusted executable software. A deployment trigger mechanism 502 sends, 512, a command to the deployed application version to the deployment interface 504. From here, a command is sent to the policy validation unit 506 to trigger the policy validation. Policies are then—upon request—received, 516, from the policy store 212. Also, the certificates are received, 518, from the certificate store 516.

Based on this, the policy validation unit 506 validates, 520, the received input. In case of a positive validation, the policy validation unit 506 sends, 522, a start command to the application runtime system 510 to start the selected application. This initiates receiving, 523, the application artifact—i.e., the trusted executable software—from the artifact repository 214 by the application runtime environment 510. Additionally, the policy validation unit 506 sends, 524 a status report to the compliance system 508. This ends the normal deployment process.

FIG. 5 also comprises a second case: a continuous monitoring of policies and certificates which is shown in the dashed-lined box 526. Such a continuous monitoring of validation may happen according to a predefined or regular schedule. For this, the policy validation unit 506 receives, 528, policies from the policy store 212, as well as, certificates from the certificate repository 216 (step 530). Again, the input is validated, 532, and the application is stopped, 534, upon a validation error. At the same time, a report status is sent, 536, by the policy validation unit 506 to the compliance system 508.

FIG. 6 shows a first portion of a block diagram of exemplary components of a system 600 supporting the method for building trusted executable software using trusted building units. The build pipeline driver 602 (compare 206, FIG. 2) requests the required source code from a secure code repository 604 and triggers, 618, individual build and validation steps. These trigger commands are received by the secure execution environment 606. In the here described context, the secure execution environment 606 comprises the building blocks build task 608, secure scanning task 610 and the testing task 612, each of which can be multiple individual scans and/or tests. For each of these tasks, a specific dedicated module can exist. On the other side, the build task 608, the security scanning task 610 and the testing task 612 obtains, 616, cryptographic keys from the key management system 614 in order to sign statements, e.g., incorporated in the conformant certificates, On the other side, the build task 608, the security scanning task 610 and the testing task 612 is in communication (622) with the certificate stored 628. Additionally, these tasks (namely, 608, 610, 612) are in communication (620) with the artifact repository 626 (compare FIG. 2, 214).

Additionally, the dotted line 632 represents the borderline between the build process of FIG. 6 and the deployment process described in the context of FIG. 7.

FIG. 7 shows a second portion the block diagram 700 of FIG. 6 of exemplary components of a system supporting the method for building trusted executable. Also here, the borderline between the build process and the deployment process is shown as dotted line 632.

If the software runtime will be activated, the policy validation module 704 is executed (or at another point in time) pulling relevant data from the artifact repository 626, the certificate store and the policy store 630.

For this, the policy validation module 704 or policy validation unit (compare 506, FIG. 5) receives—upon request—relevant data from the artifact repository 626, the certificate store and the policy store, namely a software artifact, a (conformant) certificate and one or more policies (or policy rules).

Based on this, the validation cycle 706 is initiated based on a trigger from the deployment interface 710. Upon a positive validation, the application runtime environment triggers and controls an execution of the trusted executable software—i.e., the application runtime 708 about which also a report is sent to and stored in the compliance system 624—in this secure execution environment 702. For continuously running trusted executable software (like operating system near drivers, frameworks or other infrastructure software) the validation cycle can be triggered regularly or according to specific events.

For completeness reasons, FIG. 8 shows a more simplified block diagram of an embodiment of the software build system 800 for building trusted executable software using trusted building units. The software build system 800, a processor 802 and a memory 804, communicatively coupled to said processor 802, wherein said memory 804 stores program code portions that, when executed, enable the processor 802, to generating—in particular, by each of the trusted building units 806—an identifier for identifying an output of the respective trusted building unit, wherein the respective trusted building unit also generates a signed confirmative certificate comprising the identifier.

The processor 802 is also enabled to utilize, by each of the distributed trusted building units, output results of at least one of a predecessor build unit of the trusted building unit as input, and validating—in particular, by a dedicated validation model 808 which can be also component of the trusted build unit 806—that each of the signed confirmative certificates conforms to a predefined set of policy rules.

Furthermore, the processor 802 is adapted for terminating—in particular by a determination module which may also be a part of the trusted building unit 806—the building of the trusted executable software if a failed validating of the signed confirmative certificate of one of the trusted building units.

It shall also be mentioned that all functional units, modules and functional blocks may be communicatively coupled to each other for signal or message exchange in a selected 1:1 manner. This applies in particular to the processor 802, the memory 804, the trusted building unit(s) 806, the validation module 808, and the termination module 810. Alternatively, the functional units, modules and functional blocks can be linked (i.e., connected) to a system internal bus system 812 for a selective signal or message exchange.

Embodiments of the present disclosure may be implemented together with virtually any type of computer, regardless of the platform being suitable for storing and/or executing program code. FIG. 9 shows, as an example, a computing system 900 suitable for executing program code related to the proposed method.

The computing system 900 is only one example of a suitable computer system, and is not intended to suggest any limitation as to the scope of use or functionality of embodiments of the present disclosure described herein, regardless, whether the computer system 900 is capable of being implemented and/or performing any of the functionality set forth hereinabove. In the computer system 900, there are components, which are operational with numerous other general purpose or special purpose computing system environments or configurations. Examples of well-known computing systems, environments, and/or configurations that may be suitable for use with computer system/server 900 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 900 may be described in the general context of computer system-executable instructions, such as program modules, being executed by a computer system 900. Generally, program modules may include routines, programs, objects, components, logic, data structures, and so on that perform particular tasks or implement particular abstract data types. Computer system/server 900 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 900 is shown in the form of a general-purpose computing device. The components of computer system/server 900 may include, but are not limited to, one or more processors or processing units 902, a system memory 904, and a bus 906 that couple various system components including system memory 904 to the processor 902. Bus 906 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random access memory (RAM) 908 and/or cache memory 910. Computer system/server 900 may further include other removable/non-removable, volatile/non-volatile computer system storage media. By way of example only, a storage system 912 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 906 by one or more data media interfaces. As will be further depicted and described below, memory 904 may include at least one program product having a set (e.g., at least one) of program modules that are configured to carry out the functions of embodiments of the present disclosure.

The program/utility, having a set (at least one) of program modules 916, may be stored in memory 904 by way of example, and not limiting, as well as an operating system, one or more application programs, other program modules, and program data. Each of the operating systems, one or more application programs, other program modules, and program data or some combination thereof, may include an implementation of a networking environment. Program modules 916 generally carry out the functions and/or methodologies of embodiments of the present disclosure, as described herein.

The computer system/server 900 may also communicate with one or more external devices 918 such as a keyboard, a pointing device, a display 920, etc.; one or more devices that enable a user to interact with computer system/server 900; and/or any devices (e.g., network card, modem, etc.) that enable computer system/server 900 to communicate with one or more other computing devices. Such communication can occur via Input/Output (I/O) interfaces 914. Still yet, computer system/server 900 may communicate with one or more networks such as a local area network (LAN), a general wide area network (WAN), and/or a public network (e.g., the Internet) via network adapter 922. As depicted, network adapter 922 may communicate with the other components of the computer system/server 900 via bus 906. It should be understood that, although not shown, other hardware and/or software components could be used in conjunction with computer system/server 900. Examples, include, but are not limited to: microcode, device drivers, redundant processing units, external disk drive arrays, RAID systems, tape drives, and data archival storage systems, etc.

Additionally, the software build system 800 for building trusted executable software using trusted building units may be attached to the bus system 906.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium(or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope and spirit of the present disclosure. The embodiments are chosen and described in order to best explain the principles of the present disclosure and the practical application, and to enable others of ordinary skills in the art to understand the present disclosure for various embodiments with various modifications, as are suited to the particular use contemplated.

Inventive concepts of the present disclosure can be summarized in the following clauses and non-limiting list of examples. Example 1 is a computer-implemented method for building trusted executable software using trusted building units, wherein a path between the building units is untrusted. The method includes generating, by each of the trusted building units, an identifier for identifying an output of the respective trusted building unit, wherein the respective trusted building unit also generates a signed confirmative certificate comprising the identifier; utilizing, by each of the distributed trusted building units, output results of at least one of a predecessor build unit of the trusted building unit as input; validating that each of the signed confirmative certificates conforms to a predefined set of policy rules; and upon a failed validating of the signed confirmative certificate of one of the trusted building units, terminating the building of the trusted executable software.

Example 2 includes the method according to example 1, wherein the signed confirmative certificate is based on an Internet security certificate comprising additional validation information.

Example 3 includes the method according to examples 1 or 2, wherein the validating of the signed confirmative certificate is based on a standard method of revoking Internet security certificates, and/or wherein all trusted building units or trusted executing environment units for an execution of the build trusted software are using standard methods for an Internet certificate revocation checking.

Example 4 includes the method according to any of the preceding examples, wherein the identifier is a hash value of the output of the respective build unit.

Example 5 includes the method according to any of the preceding examples, wherein the generating the signed confirmative certificate also comprises testing the build trusted executable software.

Example 6 includes the method according to any of the preceding examples, also comprising re-validating the build trusted executable software; and generating a related new signed confirmative certificate.

Example 7 includes the method according to example 6, wherein the re-validating is repeated for a plurality of different security scan types.

Example 8 includes the method according to any of the preceding examples, wherein the generating the signed confirmative certificate represents that the output of the trusted build unit complies with a predefined set of rules.

Example 9 includes the method according to example 8, wherein the predefined set of rules is stored outside a development framework of which the trusted build units are part of.

Example 10 includes the method according to any of the preceding examples, and also comprises upon a failed verification of any of the signed confirmative certificates during an execution phase of the output of the trusted build units, terminating an execution of the trusted executable software.

Example 11 includes a software build system for building trusted executable software using trusted building units, wherein a path between the building units is untrusted. The system includes a processor and a memory, communicatively coupled to said processor, wherein said memory stores program code portions that, when executed, enable the processor, to generate, by each of the trusted building units, an identifier for identifying an output of the respective trusted building unit, wherein the respective trusted building unit also generates a signed confirmative certificate comprising the identifier; utilize, by each of the distributed trusted building units, output results of at least one of a predecessor build unit of the trusted building unit as input; validate that each of the signed confirmative certificates conforms to a predefined set of policy rules; and upon a failed validating of the signed confirmative certificate of one of the trusted building units, terminate the building of the trusted executable software.

Example 12 includes the system according to example 11, wherein the signed confirmative certificate is based on an Internet security certificate comprising additional validation information.

Example 13 includes the system according to examples 11 or 12, wherein the validating of the signed confirmative certificate is based on a standard method of revoking Internet security certificates, and/or wherein all trusted building units or trusted executing environment units for an execution of the build trusted software are using standard methods for an Internet certificate revocation checking.

Example 14 includes the system according to any of the examples 11 to 13, wherein the identifier is a hash value of the output of the respective build unit.

Example 15 includes the system according to any of the examples 11 to 14, wherein the generating the signed confirmative certificate also comprises testing the build trusted executable software.

Example 16 includes the system according to any of the examples 11 to 15, wherein the processor is also adapted to re-validating the build trusted executable software; and generating a related new signed confirmative certificate.

Example 17 includes the system according to example 16, wherein the re-validating is repeated for a plurality of different security scan types.

Example 18 includes the system according to any of the examples 11 to 17, wherein the generating the signed confirmative certificate represents that the output of the trusted build unit complies with a predefined set of rules.

Example 19 includes the system according to any of the examples 11 to 18, wherein the processor is also adapted to upon a failed verification of any of the signed confirmative certificates during an execution phase of the output of the trusted build units, terminating an execution of the trusted executable software.

Example 20 is a computer program product for building trusted executable software using trusted building units, wherein a path between the building units is untrusted. The computer program product includes a computer readable storage medium having program instructions embodied therewith, said program instructions being executable by one or more computing systems or controllers to cause said one or more computing systems to generate, by each of the trusted building units, an identifier for identifying an output of the respective trusted building unit, wherein the respective trusted building unit also generates a signed confirmative certificate comprising the identifier; utilize, by each of the distributed trusted building units, output results of at least one of a predecessor build unit of the trusted building unit as input; validate that each of the signed confirmative certificates conforms to a predefined set of policy rules; and upon a failed validating of the signed confirmative certificate of one of the trusted building units, terminate the building of the trusted executable software.

What is claimed is:

1. A computer-implemented method for building trusted executable software using trusted building units, wherein a path between said building units is untrusted, the method comprises:
    generating, by each of the trusted building units, an identifier for identifying an output of a respective trusted building unit, wherein the respective trusted building unit also generates a signed confirmative certificate comprising said identifier;
    utilizing, by each of said distributed trusted building units, output results of at least one of a predecessor build unit of said trusted building unit as input;
    validating that each of said signed confirmative certificates conforms to a predefined set of policy rules; and
    upon a failed validating of said signed confirmative certificate of one of said trusted building units, terminating said building of said trusted executable software.

2. The method according to claim 1, wherein said signed confirmative certificate is based on an Internet security certificate comprising additional validation information.

3. The method according to claim 1, wherein said validating of said signed confirmative certificate is based on revoking Internet security certificates, and wherein all trusted building units or trusted executing environment units for an execution of said build trusted software are using standard methods for an Internet certificate revocation checking.

4. The method according to claim 1, wherein said identifier is a hash value of said output of said respective build unit.

5. The method according to claim 1, wherein said generating said signed confirmative certificate also comprising:
testing said build trusted executable software.

6. The method according to claim 1, also comprising:
re-validating said build trusted executable software; and
generating a related new signed confirmative certificate.

7. The method according to claim 6, wherein said re-validating is repeated for a plurality of different security scan types.

8. The method according to claim 1, wherein said generating said signed confirmative certificate represents that said output of said trusted build unit complies with a predefined set of rules.

9. The method according to claim 8, wherein said predefined set of rules is stored outside a development framework of which said trusted build units are part of.

10. The method according to claim 1, also comprising:
upon a failed verification of any of said signed confirmative certificates during an execution phase of said output of said trusted build units, terminating an execution of said trusted executable software.

11. A software build system for building trusted executable software using trusted building units, wherein a path between said building units is untrusted, said system comprising:
a processor and a memory, communicatively coupled to said processor, wherein said memory stores program code portions that, when executed, enable said processor, to:
generate, by each of said trusted building units, an identifier for identifying an output of said respective trusted building unit, wherein said respective trusted building unit also generates a signed confirmative certificate comprising said identifier;
utilize, by each of said distributed trusted building units, output results of at least one of a predecessor build unit of said trusted building unit as input;
validate that each of said signed confirmative certificates conforms to a predefined set of policy rules; and
upon a failed validating of said signed confirmative certificate of one of said trusted building units, terminate said building of said trusted executable software.

12. The system according to claim 11, wherein said signed confirmative certificate is based on an Internet security certificate comprising additional validation information.

13. The system according to claim 11, wherein said validating of said signed confirmative certificate is based on revoking Internet security certificates, and wherein all trusted building units or trusted executing environment units for an execution of said build trusted software are using standard methods for an Internet certificate revocation checking.

14. The system according to claim 11, wherein said identifier is a hash value of said output of said respective build unit.

15. The system according to claim 11, wherein said generating said signed confirmative certificate also comprising:
testing said build trusted executable software.

16. The system according to claim 11, wherein said processor is also adapted to: re-validating said build trusted executable software; and generating a related new signed confirmative certificate.

17. The system according to claim 16, wherein said re-validating is repeated for a plurality of different security scan types.

18. The system according to claim 11, wherein said generating said signed confirmative certificate represents that said output of said trusted build unit complies with a predefined set of rules.

19. The system according to claim 11, wherein said processor is also adapted to: upon a failed verification of any of said signed confirmative certificates during an execution phase of said output of said trusted build units, terminating an execution of said trusted executable software.

20. A computer program product for building trusted executable software using trusted building units, wherein a path between said building units is untrusted, said computer program product comprising a computer readable storage medium having program instructions embodied therewith, said program instructions being executable by one or more computing systems or controllers to cause said one or more computing systems to:
generate, by each of said trusted building units, an identifier for identifying an output of said respective trusted building unit, wherein said respective trusted building unit also generates a signed confirmative certificate comprising said identifier;
utilize, by each of said distributed trusted building units, output results of at least one of a predecessor build unit of said trusted building unit as input;
validate that each of said signed confirmative certificates conforms to a predefined set of policy rules; and
upon a failed validating of said signed confirmative certificate of one of said trusted building units, terminate said building of said trusted executable software.

\* \* \* \* \*